Oct. 12, 1948.　　　A. L. BAKER ET AL　　　2,451,145
LINED PIPE
Filed June 2, 1944　　　2 Sheets-Sheet 1
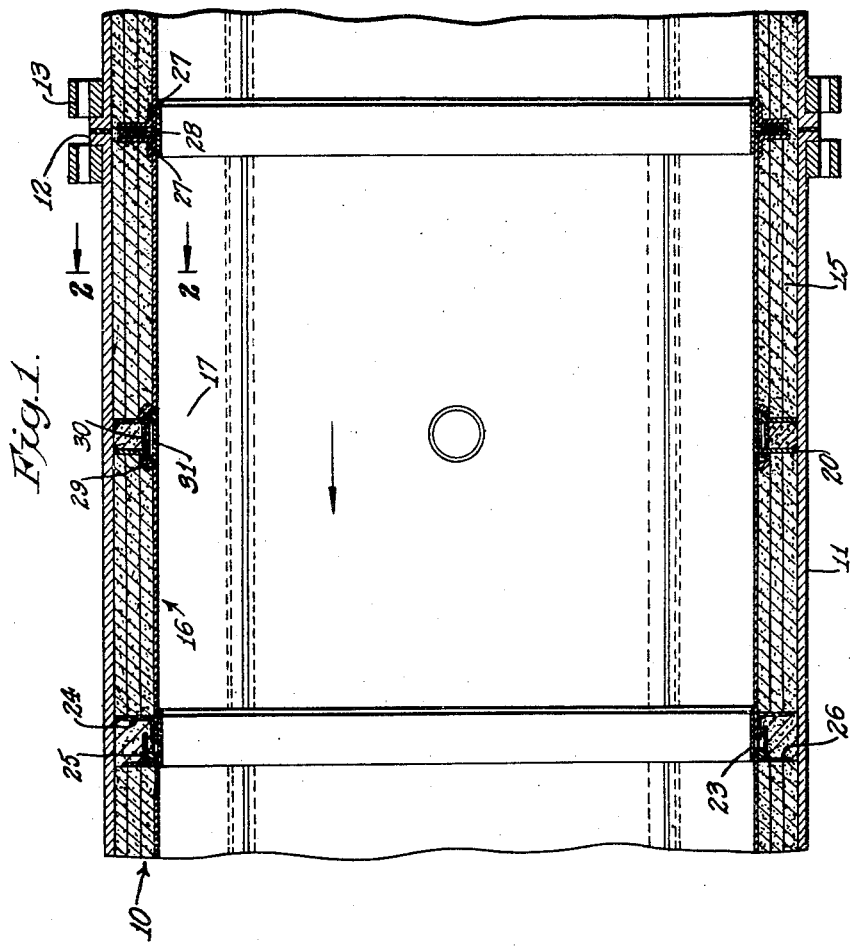
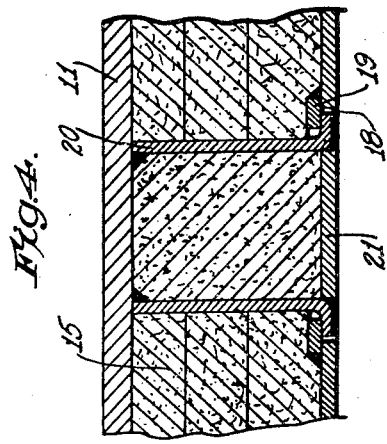
INVENTORS
Albert L. Baker
Arthur R. C. Markl
BY Anthony Blahut
Virgil F. Danco
ATTORNEY Oct. 12, 1948.    A. L. BAKER ET AL    2,451,145
LINED PIPE
Filed June 2, 1944    2 Sheets-Sheet 2
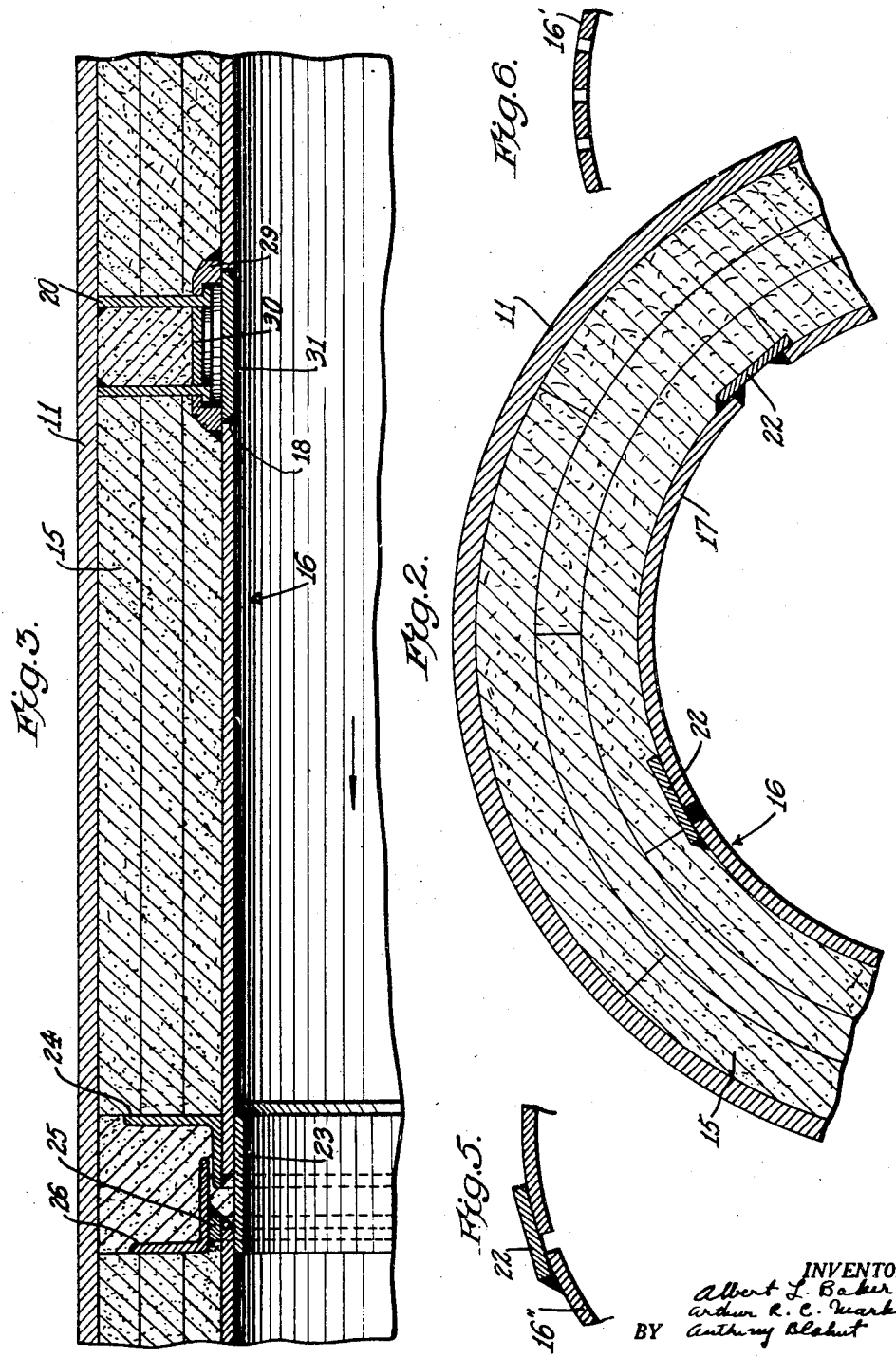
INVENTORS
Albert L. Baker
Arthur R. C. Markl
BY Anthony Blahut
Virgil F. Davies
ATTORNEY Patented Oct. 12, 1948

2,451,145

UNITED STATES PATENT OFFICE 2,451,145

LINED PIPE

Albert L. Baker, Summit, Arthur R. C. Markl, Teaneck, and Anthony Blahut, Trenton, N. J., assignors to The M. W. Kellogg Company, New York, N. Y., a corporation of Delaware Application June 2, 1944, Serial No. 538,432

10 Claims. (Cl. 138—64)

This invention relates in general to conduits, vessels and the like, through which materials are conducted or in which materials are processed and in particular to novel apparatus for controlling the transfer of heat from the material within the conduit or vessel to the atmosphere or other external medium.

It is now usual in many arts to provide conduits and vessels for handling materials at extremely high temperatures and often also under extreme pressure. Temperatures in excess of 1000° F. and pressures in excess of 1000 lbs. per square inch are not uncommon. Many of the materials handled, furthermore, are corrosive. Fabricators of conduits and vessels for this class of service have found that carbon steel is not a satisfactory material of construction because of its low creep-strength and inferior corrosion resistance and have turned to alloys of superior creep-strength and corrosive resistance. These alloys while desirable because of their special properties are much more expensive than carbon steel, are more difficult to fabricate, require expensive heat treatment to develop their special properties and are more troublesome to maintain and repair.

It has been proposed to dispose an insulation lining against the inner wall of the conduit or vessel to thereby reduce the temperature of the inner wall to the temperature range in which the behavior and properties of carbon steel are well known and in which carbon steel is fully satisfactory as the material of construction. The proposal of this character disclosed in copending application Serial No. 440,922, now Patent No. 2,369,204, has gone into wide commercial use and has been instrumental in saving large quantities of war essential alloys and man-hours and in accelerating the construction of many essential war plants. The embodiments disclosed in said copending application, while generally satisfactory are not best suited for vessels or conduits of large diameter because the size and weights of the liner and liner sections makes it difficult and sometimes impossible to handle and maintain them. The present invention is directed to the provision of a liner disposed against the inner wall of the vessel or conduit which can be successfully employed in vessels and conduits of large size regardless of the angle of disposition of the vessel or conduit.

It is a primary object of this invention to provide a heat insulating lining adapted to be disposed against the inner wall of vessels, conduits and the like, which, while not limited thereto, can be successfully employed with vessels, conduits and the like of any usable large size and diameter. It is also an important object of the invention to provide such an insulating lining which can be successfully employed with such vessels, conduits and the like, regardless of the angular disposition of such vessels, conduits and the like. It is a further important object of the invention to provide such an insulating lining for such conduits, vessels and the like, which can be easily and cheaply fabricated, installed and maintained.

It is also a primary object of the invention to provide a heat insulating lining adapted to be disposed against the inner wall of vessels, conduits and the like, and particularly those of large size and diameter which includes an internal metal liner element formed of a plurality of panels of easily handled size, the panels being supported from the vessel wall in such a manner that the metal liner element is free to expand and contract both radially and longitudinally regardless of the angular disposition of the vessel, conduit and the like, while the weight of the liner element is carried by the supports so that the weight of the liner element is evenly distributed and cannot accumulate at a point or line to cause failure of the liner element or compress the insulating material to such an extent as to materially alter its insulating value. It is also an object of the invention to so support the metal panels that the heat barrier provided by the insulating material disposed between the metal liner and the wall of the conduit, vessel and the like, is interrupted to a minimum degree by metal connections between said wall and said panels.

It is also a further object of the invention to provide a novel arrangement for supporting a metal liner element from the wall of a vessel, conduit, and the like so that said liner element is free to expand and contract both radially and longitudinally.

The further objects, features, and advantages of the invention will be readily apparent from a consideration of the following description of a present preferred embodiment of the invention taken with the accompanying drawings, in which, Fig. 1 is a fragmentary longitudinal section of a vessel, conduit and the like, lined in accordance with the invention, Fig. 2 is a fragmentary sectional view taken on line 2—2 of Fig. 1.

Fig. 3 is a view similar to Fig. 1 but on an enlarged scale,

Fig. 4 is a sectional view illustrating another form of support arrangement, and Figs. 5 and 6 are fragmentary views illustrating structural variations.

The novel insulating lining of the invention is of general application and may be applied to vessels, conduits, and the like of any sort that are used for any purpose. Thus, the novel insulating lining may be applied to vessels, conduits, and the like used for handling, storing, processing, or flowing liquids, solids, gases, or vapors or mixtures thereof. For the sake of brevity, the apparatus to which the lining is applied will hereinafter be referred to as a vessel and by this term it is intended to include vessels, conduits, pipes and the like to which the invention may be applied.

While the novel insulating lining of the invention may be applied to vessels of any size and diameter it is especially adapted for application to vessels of large size and diameter. Thirty-six inches diameter may be taken as the lower limit of the large diameter vessel range, however, this will vary considerably with the service in which the vessel is to be used.

Vessel 10 having a wall 11 of appropriate thickness is shown as including two portions united by flanges 12. Flanges 12 may be held in engaging relation by any conventional means as for instance rings 13 and appropriate bolts.

The inner surface of wall 11 is lined with a depth of insulating material 15 which is maintained in position by metal liner 16. The depth of the insulating material employed is such as to provide a heat barrier of the proper insulating value to secure the desired temperature drop between the heated material handled in vessel 10, which may be at temperatures in excess of 1500° F., and wall 11. The temperature drop chosen is generally sufficient to prevent the temperature of wall 11 from rising beyond the range in which carbon steel is a satisfactory material of construction.

Insulating material 15 may be of any preferred kind and character which will withstand the operating conditions of the particular installation without substantial deterioration or change in insulating value. It is at present preferred to employ insulation in block form because of the ease in handling and positioning. A block insulation made up of amosite asbestos, diatomaceous earth and a suitable binder has given satisfactory service in vessels handling a material containing aciduous components and at temperatures of about 1400° F.

The metal of liner 16 may be of any preferred analysis which will withstand the operating conditions satisfactorily. Since metal liner 16 is not depended upon to withstand any substantial pressures it can conveniently be made of carbon steel unless the material handled is corrosive or the temperature is excessive. In such event metal liner 16 can be made of an alloy such as chrome-steel, chrome-nickel steel, etc., having the required corrosion and/or heat resisting properties. Liner 16 is referred to as made of metal as such material is best adapted to withstand operating conditions which make the internal lining of vessel 10 desirable; however, the invention is not limited to a metal liner, any material having the necessary properties may be employed.

Metal liner 16 is made up of a plurality of independent sections so supported that each section can expand radially and longitudinally independently of every other section; also, each section is so supported that no matter in what position vessel 10 is disposed relative to the horizontal the weight of each section is distributed over and carried by the supports of each section and only by such supports. Furthermore, the supports are such that there is a minimum interruption in the heat barrier provided by the continuous insulating liner 15 and such interruption occurs only at well spaced points so that hotspots, if any, are isolated and their total area is very small in comparison to the area of the outer face of wall 11. Also, due to the spacing and size of the supports there is sufficient metal of wall 11 between such supports to absorb the heat transmitted by the supports and thus reduce the possibility of hotspots to a minimum.

As shown in Figs. 1, 2, and 3, each section of liner 16 is formed of a plurality of individual panels 17 which are united by welding, after being placed in position, into an impervious cylinder. The panels are of a length and width as to be easily handled. Thus, the panels and the sections may be about three feet long, the panels being usually about the same width. Four panels are shown but any suitable number may be employed depending on the diameter of the cylinder desired. The width of the panels will, of course, be such as to close the cylinder with a minimum space between the edges of the panels.

A hole 18 is provided at approximately the center of each panel 17. Hole 18 is backed by an annular member 29 attached to the panel. Member 29 is approximately L-shaped in cross-section, the axial leg of the L being of a length sufficient to provide all the necessary relative movement between the flared end of cylindrical member 20 and the panel 17. Cylindrical member 20 is packed with insulation material and may have its flared end reenforced, when necessary, by means of member 30. Member 30 may be a bar, a cross, or a disc. Usually, member 30 is not required.

Annular member 29 is attached to panel 17 before the panel is placed in position. After the panel is placed in position a hole is formed in insulation 15 to accommodate cylindrical member 20 which is welded to wall 11 as shown. After the cylindrical member 20 is packed with insulation and member 30 attached, when such a member is employed, hole 18 is closed by a disc 31 welded to the walls of the panel and to annular member 29.

In the alternative construction shown in Fig. 4 the hole 18 is backed by a flat ring 19 of somewhat smaller diameter than hole 18 to provide a shoulder which limits the inward radial movement of panel 17 relative to cylindrical member 20. This member 20 is welded to the wall 11 of vessel 10 and is filled with insulation. The inner end of member 20 is flared outwardly so that it can contact ring 19. A disc 21 is welded to the flared end of member 20 to seal it. The support construction shown in Figs. 1 and 3 generally is preferred since it offers no obstruction to the flow of the medium handled and all of the surface of the panel is impervious to the passage of the material handled.

The panels may be welded together in any preferred way; at present it is found desirable to weld a backing strip 22 to one edge of each panel so that said strip extends well beyond the edge of the adjacent panel and then welding the two panel edges and the backing strip together by a single weld or, when the spacing of the panel edges necessitates it, welding each panel edge to the backing strip by a separate weld. When a smooth surface is required the space between the separate welds may be filled with weld metal. This arrangement greatly simplifies the welding and makes it posible to close the circumference of the section easily and with a minimum use of panels of odd widths.

At the downstream end of each section is provided a lap ring 23 to insure smooth flow over the joint between adjacent sections and to prevent by-passing of the material handled. Ring 23 is welded to all of the panels of the section and extends beyond the edges of the panels of its section to an extent sufficient to overlap the edge of the adjacent section so that it serves in addition to guide the adjacent sections in their movement and to keep the sections in alignment.

At the downstream end of each section, other than the downstream ends that occur at joints in vessel 10, is also a stiffener angle ring 24. Ring 24 is welded to the edges of all of the panels with one leg extending toward the adjacent section of liner 16 and serves to additionally stiffen the end of its section. At the upstream end of each section, other than the upstream ends that occur at joints in vessel 10, is welded to the edges of all the panels a spacing ring 25, to which is welded an angle ring 26. One leg of angle ring 26 extends towards the adjacent section of liner 16 a distance sufficient to overlap a substantial portion of a leg of angle ring 24 and thereby aids in aligning the sections and maintaining them in alignment during relative movement.

At the ends of the sections of liner 16 that occur at joints in vessel 10 angle rings 27 are welded directly to the ends of the sections with longitudinal legs extending toward the centers of their respective panels, and with enough space provided between their radial legs to accommodate flange packing rings 28 between them.

It is to be noted that the construction at the ends of the sections of liner 16 serves not only to stiffen the ends of the sections, to guide the sections in their relative movement and to align the sections but it also serves as a pressure equalizing means while it provides a stop, or at least as a substantial impediment, to the flow of the medium handled through the space occupied by insulation 15.

Thus, while the fit between lap ring 23 and the end of the adjacent section and between the legs of angle rings 24 and 26 is tight enough to assure the proper carrying out of the aligning and guiding function of these members it is loose enough to allow a ready equalization of pressure between the space occupied by insulation 15 and the space enclosed by metal liner 16, however, by reason of the restricted and tortuous path provided by these members no substantial by-passing of the material handled through the space occupied by insulation 15 will take place.

While the metal liner sections have been shown as continous cylinders in certain classes of service it is possible to operate successfully with the liner sections made up of perforated panels 16' as shown in Fig. 6 or as made up of unconnected panels 16" as shown in Fig. 5. The use of the panels 16' and 16" is possible when the insulating material is in the brick form, as for instance, when it is insulating brick and is not affected deleteriously by the material handled.

We claim:

1. A vessel adapted to contain material, an insulating lining positioned against the inner wall of said vessel providing a heat barrier between said inner wall and the interior of said vessel, said lining including a depth of insulating material covering the inner wall of said vessel and a jacket between said insulation and the interior of the vessel, said jacket being made up of separate units and means united to the vessel wall supporting each of said units individually for free longitudinal and radial expansion.

2. A vessel, an insulating lining positioned against the inner wall of said vessel, said lining including a depth of insulating material covering the inner wall of said vessel and a jacket for said insulation between said insulation and the interior of said vessel, said jacket being made up of a plurality of separate units each having an imperforate wall, means united to the vessel wall supporting each of said units individually for free longitudinal and radial expansion, the ends of adjacent units being spaced sufficiently to provide access to the space occupied by said insulation by the medium handled in the vessel for pressure equalization, and means at the ends of said units preventing substantial flow of the material handled in the vessel through the space occupied by said insulation from a region of high pressure to a region of low pressure.

3. A vessel, adapted to contain material, an insulating liner positioned against the inner wall of said vessel providing a heat barrier between said inner wall and the interior of said vessel, said liner including a depth of insulating material covering the inner wall of said vessel, a metal jacket between said insulation and the interior of said vessel, said metal jacket being made up of a plurality of juxtaposed metal panels, and individual support means for each of said panels united to the vessel wall supporting the respective panels substantially at the center thereof for radial and longitudinal expansion and contraction.

4. A vessel adapted to contain material, an insulating liner positioned against the inner wall of said vessel providing a heat barrier between said inner wall and the interior of said vessel, said liner including a depth of insulating material covering the inner wall of said vessel, a metal jacket between said insulating material and the interior of said vessel, said metal jacket being made up of at least one annular section, and means fixed to the wall of said vessel equally spaced about said sections in a transverse plane passing substantially through the middle of said section supporting all of the weight of said section while permitting said section to expand and contract freely both radially and longitudinally.

5. A vessel, an insulating liner positioned against the inner wall of said vessel, said liner including a depth of insulating material covering the inner wall of said vessel, a metal jacket between said insulating material and the interior of said vessel, said metal jacket being made up of at least one annular section, and means spaced about said section in a transverse plane passing substantially through the middle of said section supporting said section for free radial and longitudinal expansion and contraction, each of said spaced means including a member fixed to the vessel wall and a member fixed to said section, said members encircling one another whereby said member fixed to said section moves freely with said section relative to said member fixed to the vessel wall as said section expands and contracts radially.

6. A vessel, an insulating liner positioned against the inner wall of said vessel, said liner including a depth of insulating material covering the inner wall of said vessel, a metal jacket between said insulating material and the interior of said vessel, said metal jacket being made up of at least one annular section, and means spaced about said section in a transverse plane passing substantially through the middle of said section supporting said section for free radial and longitudinal expansion and contraction, each of said spaced means including a cylindrical member having one end fixed to the vessel wall and an annular member fixed to said section, said cylindrical member and said annular member encircling one another, and means on one of said members limiting the relative movement between said members.

7. A vessel, an insulating liner positioned against the inner wall of said vessel, said liner including a depth of insulating material covering the inner wall of said vessel, a metal jacket between said insulating material and the interior of said vessel, said metal jacket being made up of at least one annular section, and means spaced about said section in a transverse plane passing substantially through the middle of said section supporting said section for free radial and longitudinal expansion and contraction, each of said spaced means including a cylindrical member having one end fixed to the vessel wall and its other end enlarged, said section having a hole therein through which said enlarged end can pass, and a ring member of smaller internal diameter than said enlarged end united to said section in backing relation to said hole, said ring member encircling said cylinder.

8. A vessel, an insulating liner positioned against the inner wall of said vessel, said liner including a depth of insulating material covering the inner wall of said vessel, a metal jacket between said insulating material and the interior of said vessel, said metal jacket being made up of at least one annular section, and means spaced about said section in a transverse plane passing substantially through the middle of said section supporting said section for free radial and longitudinal expansion and contraction, each of said spaced means including a cylindrical member having one end fixed to the vessel wall and its other end enlarged, an annular member united to said section encircling said cylindrical member, said annular member having an annular chamfer therein adapted to house said enlarged end, said chamfer being of a depth sufficient to allow the necessary movement between said section and said enlarged end during radial expansion and contraction of said section.

9. A vessel adapted to contain material, a jacket positioned adjacent the walls of said vessel defining with said vessel walls a chamber separated from the central material containing space of said vessel, said chamber and jacket providing a barrier to the flow of heat from the contained material to the vessel walls, said jacket being made up of a plurality of separate units, and means united to the vessel walls supporting each of said units individually for free longditudinal and radial expansion.

10. A vessel adapted to contain material, a metal jacket positioned adjacent the walls of said vessel defining with said vessel walls a chamber separated from the central material containing space of said vessel, said chamber and said jacket providing a barrier to the flow of heat from the contained material to the vessel walls, said metal jacket being made up of at least one annular section, and means fixed to the walls of said vessel equally spaced about said section in a transverse plane passing substantially through the middle of said section supporting all of the weight of said section while permitting said section to expand and contract freely both radially and longitudinally.

ALBERT L. BAKER.
ARTHUR R. C. MARKL.
ANTHONY BLAHUT.

REFERENCES CITED

The following references are of record in the file of this patent:

UNITED STATES PATENTS

| Number | Name | Date |
| --- | --- | --- |
| 696,059 | Line | Mar. 25, 1902 |
| 942,436 | Caney | Dec. 7, 1909 |
| 987,098 | Scott | Mar. 14, 1911 |
| 1,045,459 | Todd et al | Nov. 26, 1912 |
| 1,315,550 | Ham | Sept. 9, 1919 |
| 1,354,706 | Warriner | Oct. 5, 1920 |
| 1,504,805 | Borsodi | Aug. 12, 1924 |
| 1,816,271 | Watcher | July 28, 1931 |
| 1,930,285 | Robinson | Oct. 10, 1933 |
| 1,930,782 | Turner | Oct. 17, 1933 |
| 2,013,193 | Stadtfeld | Sept. 3, 1935 |
| 2,108,159 | Barman | Feb. 15, 1938 |